United States Patent Office 3,083,225
Patented Mar. 26, 1963

---

3,083,225
BOROXINE COMPOSITIONS
Frank H. May, Whittier, Calif., assignor to American Potash & Chemical Corporation, a corporation of Delaware
No Drawing. Filed Oct. 23, 1959, Ser. No. 848,236
1 Claim. (Cl. 260—462)

This application is a continuation-in-part of application Serial No. 699,465, filed November 29, 1957, now abandoned, which was a continuation-in-part of application Serial No. 470,511, filed November 22, 1954, now abandoned.

This invention relates to the manufacture of boroxines. These compounds are well known and are generally regarded as six-membered ring structures of alternate boron and oxygen atoms with organic groups on the three boron atoms. However, investigations have revealed that alkoxy boroxine preparations contain a variety of polymeric boron oxides which may be substituted to various degrees with alkoxy groups. Thus they can be regarded as compounds in which boric oxide is dissolved in a borate ester and having the formula $$(RO)_3B \cdot (B_2O_3)_x$$

where $x$ is any positive fractional or whole value. In view of the indefiniteness as to the value of $x$, it follows that the compositions vary widely.

Heretofore boroxines have been made by heating a mixture of a borate ester and boric oxide under conditions of relatively high temperature and high pressures (see Goubeau and Keller, Zeit. Ang. Chem. 267, 1–26 [1951]). Since this method required manufacture of the pure borate ester before preparation of its boroxine could be undertaken, it followed that many boroxines could not be prepared or else were laboratory curiosities because the starting ester could not be made or else was in turn such a curiosity. This invention provides a process for the ready preparation of the borate ester of any alcohol in god yield and of a purity suitable to the subsequent preparation of the boroxine from such ester.

It is an object of this invention to provide the process for the preparation of a boroxine which eliminates the necessity of utilizing a refined borate ester as a reactant.

A further object of this invention is to provide an in situ process for the preparation of a boroxine in an expeditious fashion and without need for pressure and prolonged heating.

Generally, it has been found that a desired boroxine may be prepared by a process which involves the addition of boric oxide to an alcohol, the boric oxide being added in sufficient quantity to precipitate boric acid as orthoboric acid in accordance with the following reaction (1), where ROH represents any alcohol:

(1)    $3ROH + B_2O_3 \rightarrow (RO)_3B + H_3BO_3$

While boric oxide can be added in slight excess of that required to satisfy Reaction 1, such excess should not exceed about 15% over that required to satisfy the aforementioned equation.

When an alcohol is esterified with a boric acid, water is one of the products of the esterification. To provide an ester of a purity suitable for most uses, this water must be removed. The separation and removal of this water provides a difficult problem; for example, in the case of ethyl borate, dehydrating agents such as strong sulfuric acid must be used in which make the process so slow and costly that heretofore ethyl borate has been largely a laboratory curiosity. With boric oxide, water does not provide any problem in formation and recovery of the ester.

Reaction 1 is subject to equilibrium conditions. It should be carried on under such conditions that after the solid phase orthoboric acid has been removed by filtration, there remains a small amount of unreacted alcohol. I have determined that such small amount of unreacted alcohol increases the rate at which boric oxide dissolves in the ester to form a boroxine and this without resort to the conditions of high temperature and high pressure which have characterized the prior art. The optimum quantity of unreacted alcohol will vary in accordance with the weight of the alcohol but generally it is small, i.e. from about 2% to less than 10% on the weight of the filtrate from the reaction carried out in accordance with Reaction 1. The maximum quantity of unreacted alcohol which can be present is slightly less than that which causes precipitation of $H_3BO_3$ when $B_2O_3$ is added to form the boroxine. The optimum quantity of a given alcohol and ester can readily be determined within the above limits by comparing the maximum quantity of $B_2O_3$ going into solution in an ester containing different quantities of the same alchol, conditions being otherwise the same.

The reaction where a small amount of additional alcohol is present, but insufficient in quantity to cause a reaction with the $B_2O_3$ to cause a secondary precipitation of $H_3BO_3$ may be regarded as follows:

(2)

$$ROH + XB_2O_3 + B(OR)_3 \xrightarrow{\Delta} (RO)_3B \cdot XB_2O_3 + ROH$$

The term alcohol as used herein includes organic hydroxy compounds in general, and thus includes such compounds as phenol and cresol. Any alcohol can be used, e.g., any primary or secondary alcohol. Preferred alcohols are alkanols such as methyl, ethyl, propyl, and butyl. The only limitation on the alcohols which may be used is that the ester-containing product obtained immediately after the initial reaction between the alcohol and $B_2O_3$ must be amenable to filtration at reasonably convenient temperatures.

It is possible to distill off the excess alcohol and thereafter add a small amount of a different alcohol up to a point where the alcohol represented 10% of the total weight. In a circuitous manner, this would also provide means for increasing the rate of solution of the boric oxide added to the filtrate.

The above procedure makes it possible to prepare boroxines containing as much as 26% boron by weight. By contrast, the boron content of the simplest borate ester, trimethyl borate, is only 10.4%. Such compositions are useful as sources of boron, as well as for various other uses, e.g., for use in a hydraulic system where a stable fluid is required, as drying agents, or as anti-yellowing agents in alcohol-solid resin coatings. These compositions also may be used as extinguishing agents for active metal fires and as neutron shielding agents.

If the added alcohol is of a higher boiling point than the alcohol from which the esters of the boroxine were derived, an ester exchange reaction will take place if the boroxine is distilled to remove excess alcohol, the lower boiling alcohol being removed to leave a mixed-ester boroxine. Such mixtures or compounds can be prepared which have specific physical properties such as boiling point or viscosity which may be required for various applications. They may also be useful as reaction media and as a source of boron and alkoxy groups in chemical synthesis. Ester exchange reactions, however, are difficult to drive to completion and in general are not satisfactory as a basic method for preparing either pure or mixed boroxines.

Using established methods, such mixed boroxines would normally be made by first preparing the separate borate esters and then reacting these with boric oxide in the proper ratios to obtain a desired product. These are costly operations because the preparation of different esters involves techniques requiring a number of different procedures and more or less complicated processing equipment. Thus, in some cases dehydrating agents may be required; in others, vacuum distillation due to the high boiling point of the esters is necessary.

Various combinations of mixed borate esters may be prepared directly in situ in the same manner as for the preparation of individual borate esters by reaction of the individual alcohols and boric oxide in accordance with Reaction 1. The boric acid crystallizes out and is separated and the filtrate is further reacted with $B_2O_3$ as described previously.

The preferred product of this invention is a boroxine containing a minimum of 90 weight percent boroxine (ester plus $B_2O_3$) with not more than 10 and preferably less than 5 weight percent alcohol which serves to prevent the crystallization of boric acid impurities. The initial reaction between boric oxide and the alcohol preferably takes place at temperatures which fall within the range 50° C. to 150° C. Filtration to remove the $H_3BO_3$ is preferably carried out, as indicated, at room temperature or below to insure that the maximum quantity of $H_3BO_3$ precipitates out. The step wherein the additional $B_2O_3$ is added to the ester-containing filtrate preferably is carried out at a temperature between about 50° C. and 150° C.

The preparation of the compositions will become further apparent upon consideration of the following illustrative methods of preparation and the compositions which were obtained.

*Example I.—Preparation of Trimethyl Borate Ester—$B_2O_3$ Composition*

A quantity of boric oxide (1830 g. of 98.5% purity) was added incrementally to a pre-heated (40–50° C.) quantity (2500 g.) of absolute methanol, in a 3/1 mole ratio of alcohol to boric oxide. The reaction was carried out in a 5 liter three-neck flask fitted with a reflux condenser, stirrer and thermometer. Enough cooling was supplied during the boric oxide addition to keep the solution hot, but below boiling; about two-thirds through the boric oxide addition, orthoboric acid solids started crystallizing. The final slurry at the end of the boric oxide addition was refluxed for ½ hour and then cooled rapidly to about 3° C. The resulting orthoboric acid solids were separated by filtration, displace washed with petroleum ether, air dried and weighed. A quantity (1643 g.) of 97% pure orthoboric acid (as determined by analysis) was obtained. This represents a 97.6 percent conversion efficiency.

A portion (2004 g.) of udiluted filtrate, which was found by analysis to contain 10.25 percent boron, was transferred to another 5 liter 3-neck flask, equipped as previously described, and heated to about 65° C. A quantity of boric oxide (1250.8 g. of 98.5% purity), sufficient to produce essentially a 1:1 mole ratio $$[(CH_3O)_3B:B_2O_3]$$

boroxine, was then added rapidly to the filtrate with continued heating. A final reaction temperature of 110° C., at which all the boric oxide had dissolved, was recorded. The reaction liquor was then cooled to about 80° C. and filtered through a clarifier filter. A quantity of 3210 g. of viscous product, representing a 96.3 percent over-all efficiency, was obtained.

The product composition was as follows:

| Methyl Boroxine, percent | Methanol, percent | Boron, percent |
|---|---|---|
| 95.3 | 4.7 | 18.09 |

*Example II.—Preparation of Trimethyl Borate Ester—$B_2O_3$ Composition*

To demonstrate the latitude of this method of preparation of boroxine solutions, insofar as the initial reaction step is concerned, the following example is presented in which a 15% excess $B_2O_3$ was used over the preferred 3/1 methanol to boric oxide ratio.

A quantity of boric oxide (2083 g. of 98% purity) was added incrementally to a pre-heated (40–50° C.) quantity (2500 g.) of absolute methanol. This reaction was carried out as previously described. At the end of the boric oxide addition, the reaction slurry was heated further to a gentle reflux (about 72–76° C.) and maintained in that temperature range for about ½ hour. The reaction slurry was then cooled rapidly in an ice bath to about 10° C. The resulting orthoboric acid solids were separated by filtration, displace washed with petroleum ether, air dried, and weighed. A quantity (1622 g.) of 96.7% pure orthoboric acid was obtained. This represents a 91.6% conversion efficiency.

A portion of undiluted filtrate (1996 g.), which was found by analysis to contain 11.93% boron, was transferred to another 5 liter 3-neck flask, equipped as previously described, and heated to about 65° C. A quantity of boric oxide (899.7 g. of 98% purity), sufficient to produce essentially a 1/1 mole ratio $[(CH_3O)_3B:B_2O_3]$ boroxine, was then added rapidly with continued heating to the filtrate. A final reaction temperature of 110° C. was reached at which all boric oxide had been dissolved.

The reaction slurry was then cooled to about 80° C. and filtered through a clarifier filter. A quantity (2850 g.) of viscous product, representing a 90.2% over-all efficiency, was obtained.

The product composition was as follows:

| Methyl Boroxine, percent | Methanol, percent | Boron, percent |
|---|---|---|
| 93 | 7 | 17.68 |

*Example III.—Preparation of Triethyl Borate Ester—$B_2O_3$ Composition*

A high boron content (about 17% B) boroxine solution was made up from boric oxide and absolute ethanol in the following manner:

A quantity of boric oxide (1271 g.) was added slowly to 2470 g. of ethanol using the previously described apparatus and procedure. The resulting reaction slurry was heated to gentle reflux (93–95° C. pot temperature) for about ½ hour. It was then cooled to about 10° C. and the orthoboric acid solids were removed by filtration. The filtrate, after removal of solids, analyzed 7.99% boron. Calculated quantities of boric oxide were then added incrementally, with stirring, to the filtrate. These $B_2O_3$ additions went into solution readily and all but a trace of solids dissolved within a period of one hour at a final solution temperature of 125° C. The resulting clear viscous liquor was found to contain 17.00% B, and had the following physical properties:

| Temperature (° C.) | Viscosity (centistokes) | Density (g./cm.³) |
|---|---|---|
| 28.2 | 79.0 | 1.153 |
| 50.6 | 18.8 | |
| 71.6 | 7.7 | 1.105 |

At the true boroxine ratio, the composition of the commercial product was as follows:

| Ethyl Boroxine, percent | Boron, percent | Ethanol, percent |
|---|---|---|
| 96.0 | 14.5 | 4.0 |

The composition of the final viscous product was as follows:

| Ethyl Boroxine, percent | Boron, percent | Ethanol, percent |
|---|---|---|
| 96.6 | 17.0 | 3.4 |

*Example IV.—Preparation of Triethyl-Trimethyl Borate Mixed Esters—$B_2O_3$ Composition*

A high boron content (about 17% B) solution was made up from boric oxide and 1/1 mol ratio mixture of ethyl and methyl alcohols. 1705 g. of boric oxide (24 moles of 98% $B_2O_3$) were added in increments to a mixture of 1659 g. (36 moles) of ethanol and 1153 grams (36 moles) of methanol, as described in previous examples. After separation of orthoboric acid solids by filtration, the resulting 5° C. filtrate analyzed 9.02% B. The calculated boric oxide requirement was then added to the pre-heated filtrate in the 50–115° C. temperature range within a period of one hour. The reaction mixture was then further heated to 120° C. in order to effect complete solution of boric oxide. The cooled product analyzed 16.9% B. Some of its physical properties are listed below:

| Temperature (° C.) | Viscosity (centistokes) | Density (g./cm.³) |
|---|---|---|
| 31.0 | 14.5 | 1.142 |
| 50.0 | 6.2 | |
| 71.8 | 2.8 | 1.096 |

The composition of the final viscous liquor was as follows:

| Mixed Boroxine, percent | Boron, percent | Alcohols, percent |
|---|---|---|
| 93.6 | 16.9 | 6.4 |

*Example V.—Preparation of Tri-n-Propyl-Tri-n-Decyl Borate Mixed Esters—$B_2O_3$ Composition*

A mixed boroxine solution, containing 8.6% B, was prepared by the previously described procedure using boric oxide and a 3/1 mole ratio mixture of n-propanol and n-decanol as alcohol raw materials.

In this preparation 278.6 g. (4 moles) of boric oxide were added in increments to a heated (70° C.) mixture of 540.8 g. (9 moles) of n-propanol and 474.8 grams (3 moles) of n-decanol. The resulting reaction slurry was further heated to a gentle reflux (117° C. pot temperature) for about ½ hour. After cooling to about 5° C., orthoboric acid solids were separated by filtration. The resulting 5° C. filtrate analyzed 4.02% B. The mixed boroxine solution was then made up from 815 grams of heated (100° C.) filtrate and 200 grams of boric oxide as previously described. The reaction slurry was heated further to 173° C. in order to effect complete solution of boric oxide. The resulting cooled boroxine mixture was found to contain 8.6% B by analysis. Some of its physical properties are listed below:

| Temperature (° C.) | Viscosity (centistokes) | Density (g./cm.³) |
|---|---|---|
| 25 | 14.2 | 0.944 |
| 50 | 6.2 | 0.929 |

The composition of the final viscous liquor was as follows:

| Mixed Boroxine, percent | Boron, percent | Alcohols, percent |
|---|---|---|
| 95.5 | 8.6 | 4.5 |

*Example VI.—Preparation of Pilot Plant Quantities of Triethyl Borate Ester—$B_2O_3$ Solution Using Denatured Alcohol*

The initial reaction step was carried out in a jacketed kettle equipped with an agitator, a water-cooled condenser, protected from atmospheric moisture by means of a silica gel tube and a thermocouple activated temperature indicator.

A quantity of boric oxide (390 pounds) was added in small increments within a period of 1½ hours to a previously heated (155° F.) 108 gallons (approx. 700 pounds) of U.S.I. Formula SDA–3A denatured ethanol (5 gallons $CH_3OH$ per 100 gallons $C_2H_5OH$). The reaction mixture was seeded with boric acid (about 5 pounds) when about half of the $B_2O_3$ had been added in order to prevent possible supersaturation. At the end of the boric oxide addition, the resulting reaction slurry was heated by circulating steam through the reactor jacket. A temperature of 208° F., at which a moderate reflux was noted, was maintained for one hour in the reactor. The slurry was next cooled over a period of four hours to a final temperature of 65° F. Orthoboric acid solids were then separated by filtration under protective atmosphere of dry nitrogen. A portion of clear filtrate (643 pounds) was then pumped back to the reactor and heated to 170° F. The calculated quantity of $B_2O_3$, required to produce a 17% boron product, was then added over a period of 40 minutes. The reactor temperature during this addition rose to 200° F. Following the $B_2O_3$ addition, the temperature was raised to 250° F. and held at this point for additional 40 minutes. About 25 pounds of "Filter-aid" were then added, and the product cooled to about 200° F. and filtered through a pressure filter into special tinned 55 gallon shipping drums.

The product solution, as well as the boric acid filtrate, were analyzed for boron content. These data, together with some of the physical properties of viscous product, are shown below:

| Ethyl Boroxine, percent | Boron, percent | Ethanol, percent |
|---|---|---|
| 93.7 | 17.0 | 6.3 |

Density _____ 1.147 g./cm.³ at 25.4° C.
Viscosity _____ 54.2 centistokes at 26.4° C.
Color _____ Light yellow green.

*Example VII.—Preparation of Tri-n-Butyl-Tri-Cyclohexyl Borate Mixed Esters—$B_2O_3$ Composition*

This example preparation was carried out using boric oxide and a 2.7:1 mole ratio mixture of n-butanol and cyclohexanol. Tri-cyclohexyl borate ester is a solid at room temperature, melting at 54–55° C.

A quantity (300 g., 5% excess) of boric oxide was added incrementally to a heated (60° C.) mixture of 333 grams of cyclohexanol and 667 grams of n-butanol. The resulting reaction slurry was heated to a gentle reflux (126° C.) and maintained at that temperature for about ½ an hour. It was then cooled to about 8° C. and orthoboric acid solids were separated by filtration. The clear filtrate was found to contain 4.36% boron by analysis. A portion of this filtrate (642 g.) was heated with agitation to 80° C. and 180 grams of boric oxide were added in increments, after which the reaction slurry was further heated to 150° C. to insure complete solution of boric oxide.

The viscous product solution was cooled to about 70° C., "Filter-aid" was added in small quantities and the hot material was filtered to remove the last traces of solids.

The composition of the clear viscous product was as follows:

| Mixed Boroxine, percent | Boron, percent | Alcohols, percent |
| --- | --- | --- |
| 91.3 | 9.9 | 8.7 |

*Example VIII.—Preparation of Tri-o-Cresyl Borate Ester—Boric Oxide Composition*

In this example preparation, a quantity (335 g.) of 98.5% pure boric oxide was added to 1585 grams of o-cresol using the previously described apparatus and procedure. The reaction slurry was held at 90° C. for one hour after which it was cooled to 21° C. The resulting orthoboric acid solids were separated by filtration, washed and dried. A quantity (296 g.) of 99.4% pure orthoboric acid solids was obtained. This represented a 96.5% conversion efficiency.

A portion of undiluted filtrate (1000 g.) which was found by analysis to contain 3.15% boron, was used for preparation of the essentially 1:1 mole ratio boroxine. A quantity of 195.6 g. boric oxide (98.5% pure) was added to the filtrate by the previously described procedure and 1150 grams of viscous product was obtained after filtration through a filter to remove turbidity. This represented a 92.8% over-all efficiency. The calculated compostion of filtered product was as follows:

| o-Cresyl Boroxine, percent | Boron, percent | Alcohols, percent |
| --- | --- | --- |
| 91.8 | 7.64 | 8.2 |

*Example IX.—Preparation of Tri-m-Cresyl, Tri-n-Butyl Borate Mixed Ester—Boric Oxide Composition*

This example preparation was carried out using boric oxide and a 4:1 weight ratio mixture of n-butanol and m-cresol. A quantity (156.2 g., 3% excess) of boric oxide (98.5% purity) was added incrementally to a preheated (55–60° C.) mixture of 413.6 g. of n-butanol and 103.4 g. of m-cresol. The resulting reaction slurry was heated to 110° C. for ½ hour and then cooled over-night to room temperature (25° C.). Orthoboric acid solids were then separated by filtration, washed with petroleum ether, air dried and weighed. A quantity (134.5 g.) of 99.4% pure orthoboric acid was obtained representing a 95.3% conversion.

A quantity (447 g.) of undiluted filtrate, which was found by analysis to contain 4.52% boron, was used in preparation of the mixed boroxine solution. Boric oxide (116.3 g. of 98.5% purity) was added to the filtrate using the previously described apparatus and procedure. A quantity (535 g.) of viscous product was obtained. This represents a 90.5% over-all conversion efficiency. The following composition was calculated for the viscous product, based on boron analysis and material balance data:

| Mixed Boroxine, percent | Boron, percent | Alcohols, percent |
| --- | --- | --- |
| 93.9 | 9.91 | 6.1 |

Obviously, many modifications and variations may be made without departing from the spirit and scope of this invention and therefore only such limitations should be imposed as are indicated in the appended claim.

I claim:

A process for preparing a boroxine which comprises:
(1) admixing and heating to a temperature within the range of about 50° C. to about 150° C. an alcohol selected from at least one of the group consisting of primary alcohols, secondary alcohols, phenols and cresols with boric oxide to form a reaction product slurry containing:
   (a) a triborate ester of said alcohol and boric acid,
   (b) a precipitate of orthoboric acid, and
   (c) from about 2% to less than 10%, by weight, based upon the weight of the liquid portion of the slurry, of unreacted alcohol,
(2) cooling the slurry to at least room temperature to insure precipitation of substantially all of the orthoboric acid,
(3) filtering the slurry to remove the precipitate and leave the filtrate,
(4) admixing with the filtrate, which contains said triborate ester and unreacted alcohol, additional boric oxide, and
(5) heating the resulting mixture to from about 50° C. to about 150° C. at atmospheric pressure to form a boroxine containing up to about 26% boron by weight the amount of boric oxide and alcohol employed in (1) being such that the unreacted alcohol present in said slurry is sufficient to promote solution in the ester of the boric oxide added in (4) and less than that amount which would cause formation and precipitation of orthoboric acid when said additional boric oxide is added in (4).

References Cited in the file of this patent

UNITED STATES PATENTS 2,262,187    Lytle et al. _____ Nov. 11, 1941

OTHER REFERENCES

Webster et al.: J. Am. Chem. Soc., vol. 55, pages 3233–5 (1933).

Goubeau et al.: Chem. Abs., vol. 46, page 3893 (1952).

Schlesinger et al.: J. Am. Chem. Soc., vol. 75, pages 213–5 (1953).